(12) United States Patent
Gaertner et al.

(10) Patent No.: US 10,387,311 B2
(45) Date of Patent: Aug. 20, 2019

(54) CACHE DIRECTORY THAT DETERMINES CURRENT STATE OF A TRANSLATION IN A MICROPROCESSOR CORE CACHE

(71) Applicant: International Business Machines Corporation, Armonk, NY (US)

(72) Inventors: Ute Gaertner, Boeblingen (DE); Christian Jacobi, West Park, NY (US); Gregory Miaskovsky, Tel Aviv (IL); Martin Recktenwald, Schoenaich (DE); Timothy Slegel, Staatsburg, NY (US); Aaron Tsai, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 15/868,700

(22) Filed: Jan. 11, 2018

(65) Prior Publication Data
US 2019/0213128 A1  Jul. 11, 2019

(51) Int. Cl.
G06F 12/0817 (2016.01)
G06F 12/0862 (2016.01)
G06F 12/0831 (2016.01)

(52) U.S. Cl.
CPC ...... *G06F 12/0828* (2013.01); *G06F 12/0831* (2013.01); *G06F 12/0862* (2013.01); *G06F 2212/602* (2013.01); *G06F 2212/621* (2013.01)

(58) Field of Classification Search
CPC ............. G06F 12/0828; G06F 12/0831; G06F 12/0862; G06F 2212/602; G06F 2212/621
See application file for complete search history.

(56) References Cited

U.S. PATENT DOCUMENTS

| 8,285,947 | B2 | 10/2012 | Beaumont-Smith |
| 9,128,725 | B2 | 9/2015 | Meier |
| 9,244,686 | B2 | 1/2016 | Henry |
| 9,244,827 | B2 | 1/2016 | Kim |
| 9,280,352 | B2 * | 3/2016 | Gunna ................. G06F 9/3836 |
| 9,600,289 | B2 | 3/2017 | Meier |

(Continued)

FOREIGN PATENT DOCUMENTS

GB  2538764 A  11/2016

*Primary Examiner* — Eric Cardwell
(74) *Attorney, Agent, or Firm* — Cantor Colburn LLP; William Kinnaman

(57) ABSTRACT

A cache structure implemented in a microprocessor core include a set predictor and a logical directory. The set predictor contains a plurality of predictor data sets containing cache line information, and outputs a first set-ID indicative of an individual predictor data set. The logical directory contains a plurality of logical data sets containing cache line information. The cache structure selectively operates in a first mode such that the logical directory receives the first set-ID that points to an individual logical data set, and a second mode such that the logical directory receives a currently issued micro operational instruction (micro-op) containing a second set-ID that points to an individual logical data set. The logical directory performs a cache lookup based on the first set-ID in response to operating in the first mode, and performs a cache lookup based on the second set-ID in response to operating in the second mode.

20 Claims, 5 Drawing Sheets

(56) References Cited

U.S. PATENT DOCUMENTS

| | | |
|---|---|---|
| 9,690,556 B2 | 6/2017 | Busaba |
| 2005/0081017 A1 | 4/2005 | Rupley |
| 2013/0339596 A1* | 12/2013 | Prasky .................. G06F 9/3802 |
| | | 711/108 |
| 2019/0042469 A1* | 2/2019 | Coe ..................... G06F 12/1054 |

* cited by examiner

CACHE DIRECTORY THAT DETERMINES CURRENT STATE OF A TRANSLATION IN A MICROPROCESSOR CORE CACHE

BACKGROUND

The present invention relates to the field of digital computer systems, and more particularly, to microprocessor cores including a logical directory.

Microprocessor core cache designs can be based on a logically indexed, absolute tagged cache directories (also referred to as absolute directories), or logically indexed, logically tagged directories (referred to herein as logical directories). Logically or absolute indexed, absolute tagged cache directories typically implement a hardware structure called a "translation lookaside buffer" (TLB) to store currently available translations. Logical directory cache structures, however, do not employ a separate TLB. Instead, the directory entries in the logical directory carry the translation information.

SUMMARY

Various non-limiting embodiments of the present invention are directed a cache structure implemented in a microprocessor core comprises a set predictor and a logical directory. The set predictor contains a plurality of predictor data sets, where each predictor data set contains cache line information. The set predictor is configured to output a first set-ID indicative of an individual predictor data set among the plurality of predictor data sets. The logical directory contains a plurality of logical data sets, where each logical data set contains cache line information. The cache structure selectively operates in a first mode such that the logical directory receives the first set-ID that points to an individual logical data set among the plurality of logical data sets, and a second mode such that the logical directory receives a currently issued micro operational instruction (micro-op) containing a second set-ID that points to an individual logical data set among the plurality of logical data sets. The logical directory performs a cache lookup based on the first set-ID in response to operating in the first mode, and performs a cache lookup based on the second set-ID in response to operating in the second mode.

One or more additional non-limiting embodiments of the present invention are directed to a computer-implemented method of determining a current state of an address translation in a microprocessor core cache, the method comprising storing a plurality of predictor data sets containing cache line information in a set predictor, and outputting a first set-ID indicative of an individual predictor data set among the plurality of predictor data sets. The method further comprises storing a plurality of logical data sets in a logical directory, where each logical data set contains cache line information. The method further includes selectively operating a cache structure in a first mode such that the logical directory receives the first set-ID, and a second mode such that the logical directory receives a currently issued micro operational instruction (micro-op) containing a second set-ID that points to an individual logical data set among the plurality of logical data sets. The method further comprises performing a cache lookup in the logical directory based on the second set-ID in response to operating in the second mode, and determining the current state of the address translation based on the cache lookup.

One or more additional non-limiting embodiments of the invention are directed to a computer program product to control a cache structure to determine a current state of an address translation in a microprocessor core cache. The computer program product includes a computer readable storage medium having program instructions embodied therewith. The program instructions are executable by an electronic computer processor to control the cache structure to perform operations comprising storing a plurality of predictor data sets containing cache line information in a set predictor, and outputting a first set-ID indicative of an individual predictor data set among the plurality of predictor data sets. The method further comprises storing a plurality of logical data sets in a logical directory, where each logical data set contains cache line information. The method further includes selectively operating a cache structure in a first mode such that the logical directory receives the first set-ID, and a second mode such that the logical directory receives a currently issued micro operational instruction (micro-op) containing a second set-ID that points to an individual logical data set among the plurality of logical data sets. The method further comprises performing a cache lookup in the logical directory based on the second set-ID in response to operating in the second mode, and determining the current state of the address translation based on the cache lookup.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
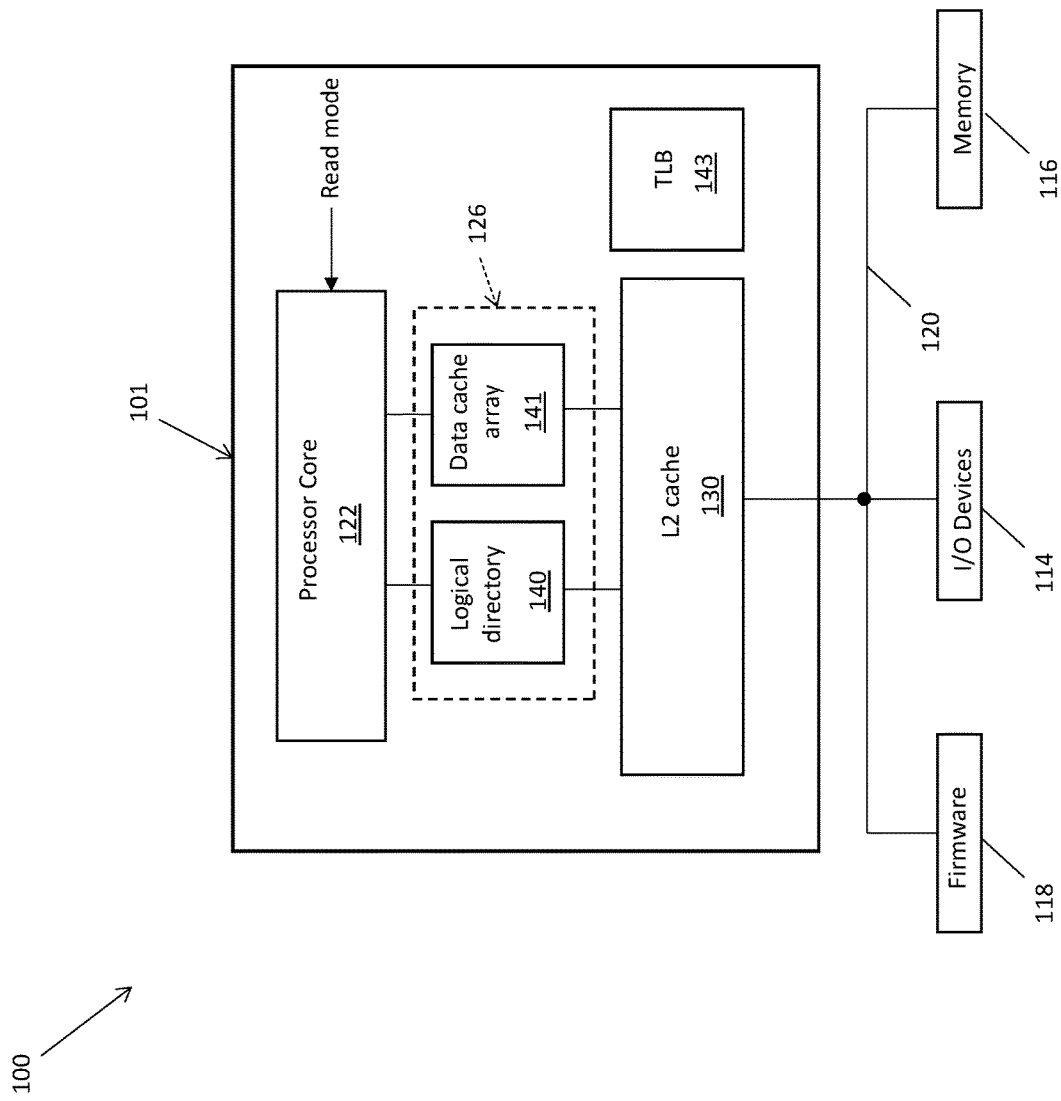
FIG. 1 depicts a computer system in accordance with an example of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, microprocessor core cache designs including logical directories typically implement a separate predictor cache (sometimes referred to as a "set predictor") to facilitate a fast access of a cache entry without relying on the results of a traditional TLB or directory lookup. Logical directory designs can also use the set predictor cache to select a single logical directory entry to read and validate the specific set selected by the set predictor rather than reading and validating all sets in parallel from the logical directory in order to save circuitry and power. However, conventional set predictors are capable of accessing the logical directory entry only when it currently points to the directory set containing the targeted directory entry which can result in missing a "hit" event.

Software or hardware implementations of address translations in the microprocessor core can realize temporality illegal states, sometimes referred to as "bugs." Therefore, it is necessary to perform a frequency "debug read" operation of the translation information. Because a logical directory entry is only accessed if the set predictor currently points to the directory set containing the targeted directory entry, the set predictor may encounter a "miss-wrong" error. A miss-wrong error is typically referred to as an event where a given directory entry exists that should "hit", but the translation information cannot be read due to the miss by the set predictor, i.e., the set predictor was not pointing to the logical directory at the correct time.

Turning now to an overview of the aspects of the invention, one or more embodiments of the invention address the above-described shortcomings of the prior art by providing microcontroller core including a logical directory, which is capable of determining the current state of a translation in a logically indexed, logically tagged (also called a "logical cache") directory where only one set can be read at a time, with minimal additional hardware overhead and execution delay. In at least one non-limiting embodiment, various microarchitectural mechanisms are modified to implement reading the translation information from a logical directory directly. A separate instruction cracking function is used to break (or "crack") a complex instruction into multiple smaller or micro operational instructions referred to as, "micro-ops". Each micro-op contains a memory operand logical address field inherited from the original instruction that corresponds to a particular index LA(50:55) and tag LA(0:49) in the logical directory and is assigned a micro-op number that identifies a given micro-op. Thus, the instruction can be cracked into a sufficient number of micro-ops such that the micro-op number assigned to a given micro-op can be used to point to a particular set in the logical directory. It should be appreciated that the index LA(50:55) described herein is an example range, it is not intended to limit the scope of the invention to any particular range. In at least one embodiment, the complex instruction utilized is a "LOAD MULTIPLE" instruction, which is broken or divided into multiple internal "load" micro-ops. Each of those micro-ops is then separately issued to a Load/Store Unit (LSU) that implements the logical cache. In one example, the LOAD MULTIPLE instruction is split such that each "load" micro-op loads one 16 byte register with values from memory (or the cache subsystem), instead of executing the whole architected operation of reading the entire operand from memory and writing multiple registers in one step. Thus, the index LA(50:55) of a given micro-op can be used to determine the particular row of the logical directory and the micro-op number of a given micro-op can be used to determine the particular set in the logical directory on which to perform a lookup.

With respect to FIG. 1, FIG. 1 illustrates a computer system 100 in accordance with an example of the present disclosure. The computer system 100 may be based on the z/Architecture, offered by International Business Machines (IBM). Computer system 100 may use a set-associative cache memory structure. Computer system 100 comprises at least one processing unit 101. In one example, the computer system 100 may be used as a hardware resource in a virtualized environment such as z/VM of IBM. For example, the processing unit 101 may receive requests from virtual machines or a guest running under a hypervisor in a logical partition.

The processing unit 101 may be connected to various peripheral devices, including input/output (I/O) devices 114 (such as a display monitor, keyboard, and permanent storage device), memory device 116 (such as random-access memory or RAM) that is used by the processing units to carry out program instructions, and firmware 118 whose primary purpose is to seek out and load an operating system from one of the peripherals whenever the computer is first turned on. Although FIG. 1 depicts a two-level cache hierarchy, multi-level cache hierarchies can be provided where there are many levels of serially connected caches. For example, the components of processing unit 101 may be packaged on a single integrated chip.

Processing unit 101 communicates with the peripheral devices (e.g. firmware 118, I/O devices 114 and memory 116) by various means, including a generalized interconnect or bus 120. Processing unit 101 includes a processor core 122 having a plurality of registers and execution units, which carry out program instructions in order to operate the computer. An exemplary processing unit includes the PowerPC™ processor marketed by International Business Machines Corporation. The processing unit 101 also can have one or more caches. For example, the processing unit 101 is shown as comprising two caches 126 and 130. Caches are used to temporarily store values that might be repeatedly accessed by a processor, in order to speed up processing by avoiding the longer step of loading the values from memory 116.

Caches 126 and 130 are set-associative caches which enable the processor to achieve a relatively fast access time to a subset of data or instructions previously transferred from a memory 116. The cache 126 may be integrally packaged with the processor core 122. The cache 126 may comprise instruction arrays (not shown) and data arrays 141 which are implemented using high-speed memory devices. Instructions and data may be directed to the respective cache by examining a signal that is indicative of whether the processor core is requesting an operation whose operand is instruction versus data.

The cache 126 includes a logical directory 140 that is associated with a data array 141. Each cache line in the data array 141 has a corresponding entry in the logical directory 140. The logical directory 140 can indicate whether the data identified by a logical address (also referred to as an effective address) is stored in the data array 141. For example, a processor instruction that references logical address can be provided to the cache 126. If the logical address is in the logical directory 140, then the processor is aware that the referenced data can be obtained from the data array 141 subject to access criteria being fulfilled, wherein access criteria may require that the valid bit is set, etc. For example, the logical address includes a tag field, a line index field, and a byte field. The tag field of the logical address is utilized to provide cache "hit" information as described herein. The line index field of the logical address is utilized to get N cache lines e.g. within data cache array 141, which are indexed by the line index field, where N is the number of sets in a N-associative cache memory. One of the N cache lines may be selected using a set identifier (as part of a late select) and the byte field of the logical address is utilized to index a specific byte within the selected cache line.

The logical directory 140 is constructed according to a logical cache design, which provides a logically indexed, logically tagged directory sometimes referred to as a "virtual directory." In at least one non-limiting embodiment, the logical directory 140 is defined as having a page size of 4,096 bytes, a cache line size of 256 bytes, and a 64 bit address space. The cache entries of the logical directory 140 carry translation information. Accordingly, address translations operations associated with the logical directory 140 translate logical address bits (LA) 0:51 into different absolute address bits (AA) 0:51. LA(0:51) to specify a given page of virtual memory. The given page holds the 16 different cache lines that all have the same LA(0:51), while address LA(52:55) are different among the entries. Address LA(56:63) describes the byte offset within a cache line.

The data array 141 and the logical directory 140 may be constructed from conventional memory arrays, such as are readily available in configurations of, for example, 4 M or 8 M chip arrays. The cache 126 is associated with a cache controller (not shown) that for example manages the transfer of data between the processor core 122 and the caches.

The data cache array 141 has many cache lines which individually store the various data values. The cache lines are divided into groups of cache lines called "sets." An exemplary cache line includes a state-bit field, an exclusivity-bit field, and a value field for storing the actual instruction or data. The state-bit field and inclusivity-bit fields are used to maintain cache coherency in a multiprocessor computer system. The address tag is a subset of the full address of the corresponding memory block. A compare match of an incoming logical address with one of the tags within the address-tag field indicates a cache "hit." The collection of all of the address tags in a cache (and sometimes the state-bit and inclusivity-bit fields) is referred to as a directory, and the collection of all of the value fields is the cache entry array.

Figure 3:
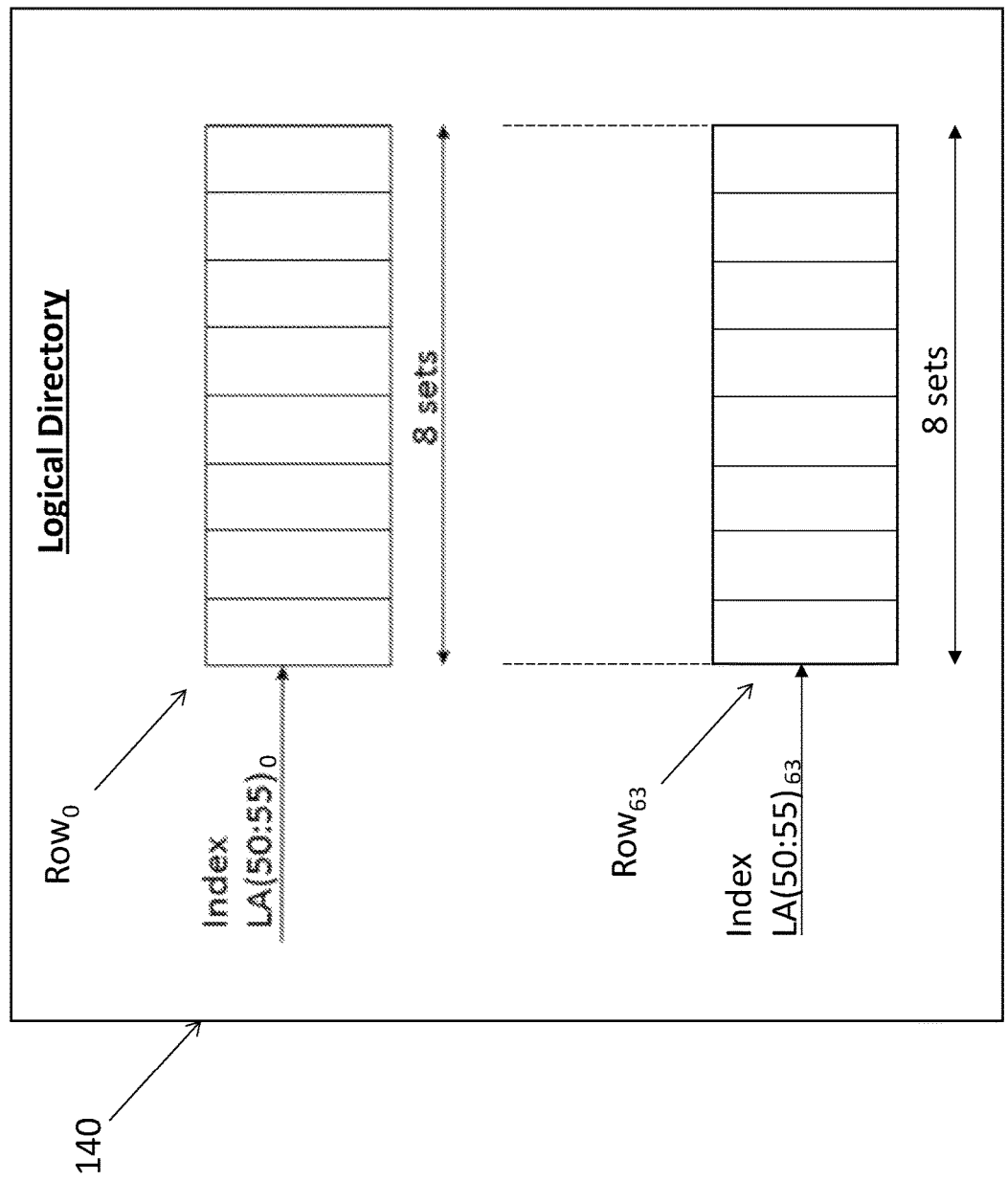
FIG. 3 illustrates a directory structure of a logical directory in accordance with an example of the present disclosure.

FIG. 3 illustrates a directory structure of a logical directory 140. The logical directory 140 is indexed with a plurality of rows (e.g., 64 rows deep), with each row having assigned thereto a local address LA(50:55). Each row of the directory contains 8 columns or 8 "sets", where each set holds cache line information. Thus, each row holds information about eight cache lines in its eight "sets". To identify a particular cache line in the logical directory 140, all eight sets corresponding to a given index LA(50:55) are read out, and all the "tags" stored in the logical directory 140 are compared. A "hit" in the cache set occurs when one set matches the tag of the cache line in question.

Referring again to FIG. 1, the cache 126 may be referred to as level 1 (L1) cache and cache 130, may be referred to as a level 2 (L2) cache since it supports the (L1) cache 126. For example, cache 130 may act as an intermediary between memory 116 and the L1 cache and can store a larger amount of information (instructions and data) than the L1 cache can, but at a longer access penalty. For example, cache 130 may have a storage capacity of 256 or 512 kilobytes, while the L1 cache may have 64 kilobytes of total storage. Cache 130 is connected to bus 120, and all loading of information from memory 116 into processor core 122 may come through cache 130.

Also shown in FIG. 1 is a translation lookaside buffer (TLB) 143 for translating logical address to a corresponding absolute address. The TLB 143 can translate the page number portion of logical address to a corresponding real page number. For example, the tag field of a logical address may be sent to TLB 143 to be translated to a corresponding real page number.

Figure 2:
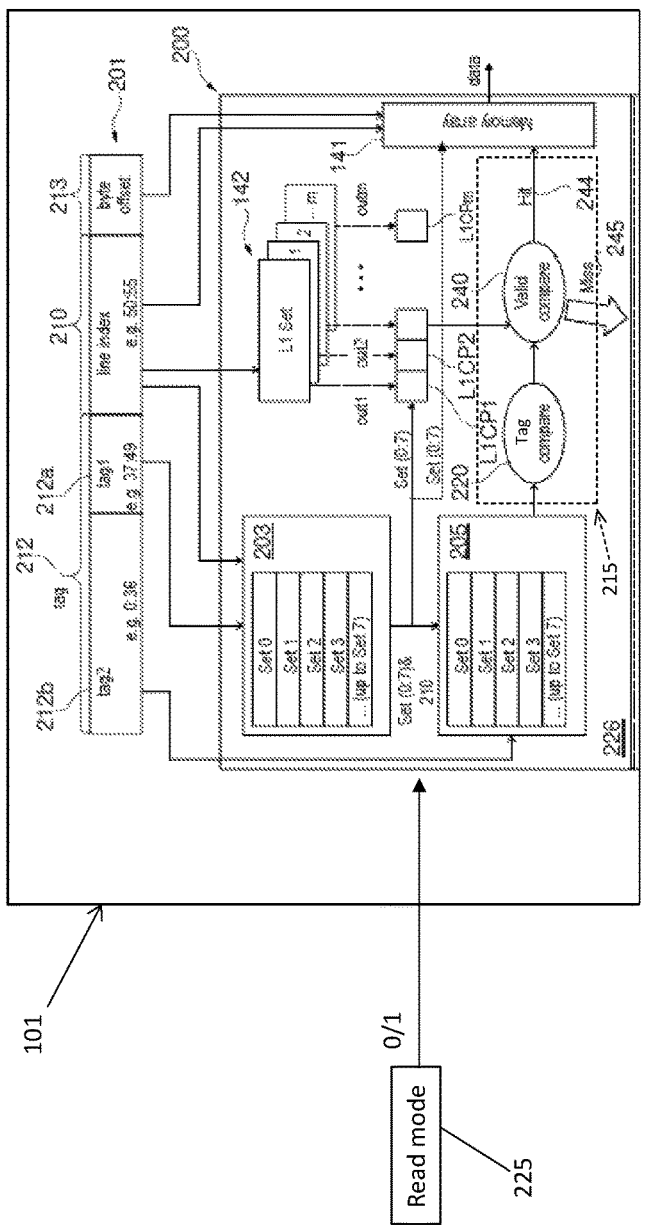
FIG. 2 is a block diagram illustrating a diagram of a cache structure capable of accessing a cache memory in accordance with an example of the present disclosure.

FIG. 2 is a block diagram illustrating a diagram for accessing cache structure 200 of a cache memory with two-level cache via a logical address (or logical address or virtual address) 201 in accordance with an example of the present disclosure. The cache memory is a set associative cache comprising for example m sets in L1 cache and n sets in L2 cache. M may or may not equal to n. The cache structure 200 comprises a L1 cache 226 and L2 cache 230. The L1 cache 226 comprises a data cache array 141, a logical directory 140, a set predictor 203 (sometimes referred to as a set directory) 203 and a logical directory 205 (sometimes referred to as a validation directory). The L2 cache 230 comprises a cache directory 242, a cache array (not shown), and a TLB 143.

The set predictor 203 can be constructed as a directory that is logically indexed using line index bits of a line index field 210 of the logical address 201 and logically tagged using a first group of bits 212a of the tag field 212 of the logical address 201. The logical directory 205 is constructed as a directory logically indexed using line index bits of the line index field 210 of the logical address 201 and set bits.

The logical directory 205 is logically tagged using a second group of bits 212b of the tag field 212 of the logical address 201. The first and second groups of bits 212a and 212b are shown non-overlapping for exemplification purpose. However, the first group and second of bits may overlap. For example, the second group of bits may comprise bits 0:49 which may enable to have set directory update rules that are relaxed e.g. that allows that the set directory and the validation directory do not have to be strictly in sync at all times.

For simplifying the description of FIG. 2, a simplified example of L1 cache may be considered. In this example, the L1 cache has 64 rows and 8 sets (i.e. m=8), and a cache line is addressed using logical address having 64 bits (0:63) (abbreviated LA(0:63)). Therefore, the line size in this example is 256 bytes. In this example, the set predictor 203 may use LA(37:49) as a tag (the first group of bits). The tag of the logical directory 205 may be LA(0:49) or LA(0:36), plus additional information required to differentiate between different address spaces.

The logical directory 205 may be referred to as a "Stacked" logical directory as the validation directory is built from one physical array structure that holds one directory entry per row. Following the above example, the validation directory comprises 8×64 rows=512 rows, instead of eight array structures that each has 64 rows. The benefit of such a structure may be that an array row can only have a limited number of bits (for physical reasons). Adding more rows comes with a comparatively low overhead relative to extending the width of a row or adding more array structures. The "stacked" approach may be advantageous as it may use less area and power. The L1 logical directory 140 has, however, an eight array structures that each has 64 rows.

When operating in a normal mode, the set predictor 203 can perform a cache lookup which receives as input the index LA(50:55) and first group of bits referred to as the tag LA(37:49). Based on these inputs, the set predictor 203 generates or predicts the data set having a set ID referred to as Set(0:7) that holds the requested cache line. For example, the set predictor 203 may be searched in order to find the set ID.

The L1 cache 226 can further include a hit detector circuit 215 which confirms a cache hit. For example, using the set ID (e.g., Set(0:7)) in addition to the index LA(50:55), the hit detector circuit looks up the logical directory 205 to confirm the cache hit using tag compare 220, which may result in identifying a corresponding directory entry in the logical directory 205. In one example, the set ID determined by the set predictor 203 is used to select one of the eight 64-row sections, and LA(50:55) is used to select the row within the section.

In at least one embodiment, the cache structure 200 can switch between the normal operating mode described above, and a read translation mode. The read translation mode can be invoked based on the bit state of a translation mode signal 225. When the read translation mode signal 225 is set to a first state, e.g., binary "0", the normal "cache lookup" and "cache miss" operations are performed as described above. When, however, the read translation mode signal 225 is set to a second state, e.g., binary "1", the system may perform alternative operations, e.g., the normal "cache miss" described above is bypassed or omitted. For example, invoking the read translation mode prevents no lookup of the TLB 143 or L2 directory 242 in response to detecting a miss event from reading the logical directory 205. Also, there is no update/invalidation of the set directory in response to a miss/no validation event from the logical directory 205. There is also no detection of "miss" from the set predictor 203 since it is bypassed. Instead, the index LA(50:55) indicated by the currently issued micro-op is set as the directory result, i.e., is used to indicate the particular logical directory set on which to perform a lookup.

As described herein, software and hardware implementations of address translations in the microprocessor core can realize temporality illegal states, sometimes referred to as "bugs." Therefore, "debug read" operations are frequently performed on the translation information. Because a logical directory entry is only accessed if the set predictor currently points to the directory set containing the targeted directory entry, the set predictor may encounter a "miss-wrong" error, where a given directory entry exists that should "hit", but the translation information is not read due to the miss by the set predictor, i.e., the predictor was not pointing to the directory at the correct time.

Figure 4:
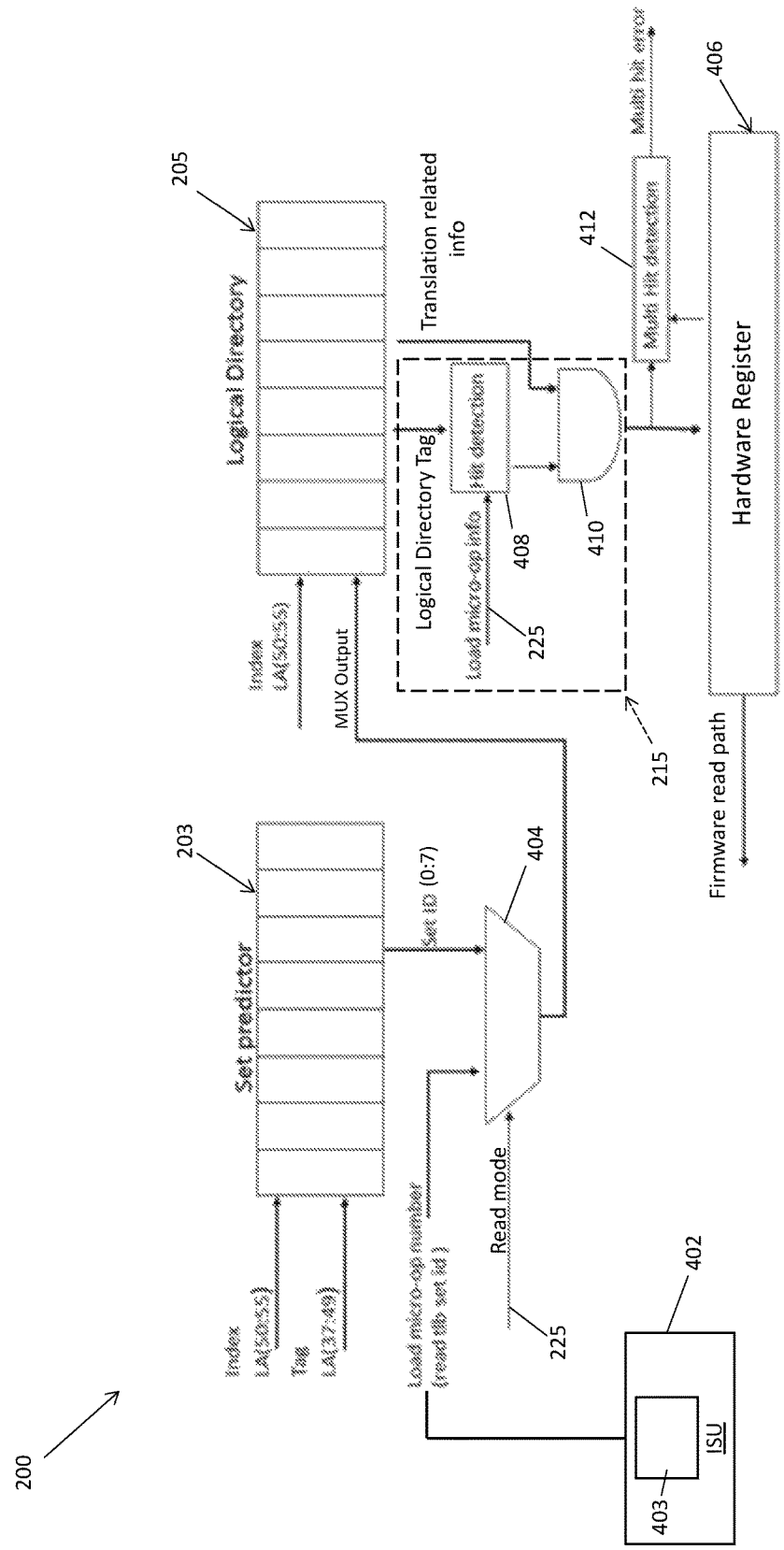
FIG. 4 depicts a cache structure capable of determining a current address translation state in accordance with an example of the present disclosure.

Turning now to FIG. 4, a cache structure 200 included in the computer system 100 is illustrated according to a non-limiting embodiment. The cache structure 200 includes a set predictor 203, an instruction sequencing unit (ISU) 402, a data selector 404, a logical directory 205, a hit detector circuit 215, and a translation state register 406. In at least one embodiment, the cache structure 200 is capable of reading the current state of the address translations, and when a hit occurs, the relevant translation state information is stored in a hardware register (e.g., the translation state register 406) which can be accessed by computer system 100 (e.g., firmware) via a read path. In this manner, the computer system 100 implementing a logically indexed, logically tagged directory (e.g., the logical directory 205) can determine the current state of an address translation.

The relevant translation state information stored in the translation state register 406 can vary depending on the instruction set architecture (ISA). In any ISA, however, the cache structure can support a "read register" operation which reads the relevant translation information stored in the translation state register 406 to determine whether a polled address translation exists in the validation directory (logical directory). In other words, the relevant translation information can indicate whether or not the requested translation achieved a "hit" in the validation directory, and can also indicate that the checked/polled translation is a "valid" and "existing" translation in the validation directory as part of the "current translation state" of the logical directory.

In additional non-limiting embodiments, other information that could be provided about the "valid"/"existing" translation that was hit and found in the logical directory can be whatever is decided to be "interesting" for that particular processor implementation for that particular ISA. When implemented in the z/Architecture processor described herein, for example, possible other information that is interesting based on a translation or translation page may include, but is not limited to: (1) Storage Key (access-control bits and/or Fetch-Protection bit); (2) DAT Protect bit; (3) Common Segment bit; (4) Private Space bit; and (5) Real Space control bit. It should be appreciated that other information can be targeted as relevant information to be stored in the register 406 if the cache structure 200 is implemented in another computer architectural system where that ISA would likely have some other translation specific information that would be targeted as of interest for that ISA.

Still referring to FIG. 4, the set predictor 203 and the logical directory are working on the same UOP of the same instruction. That is, for a given UOP, the same LA(50:55) of the UOP is input to both the set predictor 203 and the local directory 205. The logical directory 205 is indexed with LA(50:55), and each "row" of the directory (e.g., 64 rows) holds information about the cache lines (e.g., eight cache lines) in its eight "sets". The set predictor 203 has a similar structure as the logical directory 205 in that it utilizes the index LA(50:55) to access one of its rows (e.g., 1 row out of 64 total rows), and each of the rows (e.g., 64 rows) includes a "set" (e.g., 8 sets). Accordingly, there is a one-to-one correlation between the set predictor 203 and the logical directory 205. For example, a specific location of the set predictor 203 for a LA(50:55) in a particular set is designed to be a one-to-one mapping to the same exact location in the logical directory 205 for that LA(50:55) and that set.

The set predictor 203 includes a first input that receives the index LA(50:55), and a second input that receives the tag LA(37:49). The index LA(50:55) indicates a particular row in the set predictor, while the tag LA(37-49) indicates a particular predictor data set in a respective row. Thus, based on these inputs, the set predictor 203 predicts the set having a set ID referred to as Set(0:7) that holds the requested cache line, and outputs a set ID signal indicative of the predicted set ID. The predicted set ID can be viewed as an 8-bit decoded signal. Each bit (0-7) in the decoded signal represents a possible directory set (e.g., among the 8 sets) to be compared. Setting one of the bits to "1" indicates the specific directory set that is selected for comparison, while all the remaining bits are set to "0" to indicate that they are excluded from the comparison. Thus, whichever bit is set to "1" indicates the set-ID that is selected for the hit detection operation discussed below.

The ISU 402 performs an instruction cracking function 403, which "cracks (or "breaks")" a complex instruction into multiple smaller operations referred to as, "micro-ops". Each micro-op is then assigned a micro-op ID number indicative of its respective operation. For example, the L1 cache 226 (see FIG. 2) can provide loading of instruction streams in conjunction with an instruction fetch unit (not shown), which pre-fetches instructions and may include speculative loading and branch prediction capabilities. The fetched instructions are then broken or "cracked" using the instruction cracking function 403 to generate units of operation (UOPs) made up of instruction text (itext) of the original instruction, and the UOPs may be distributed among multiple processing paths, pipelines, execution units, etc. Although the instruction cracking function 403 is illustrated as residing in the ISU 402, the location of the cracking function 403 is not limited thereto. For example, the instruction cracking function 403 could reside in an instruction dispatch unit (IDU), for example.

The fetched instructions, including the cracked UOPs are decoded by an instruction decode unit (IDU) into instruction processing data. Although not shown, the instruction decode unit 107 may contain the instruction cracking function 403, or the ISU 402 itself may independently perform the cracking operation in connection with a decode operation.

Based on the UOPs of the decoded (non-cracked and cracked) instructions, the ISU 402 controls the issuing of the instructions and UOPs of non-cracked and cracked instructions. In at least one embodiment, the ISU 402 is in signal communication with one or more load/store units (LSUs) (not shown) which implements a virtual cache. The multiple LSU pipelines are treated as execution units for performing loads and stores and address generation for branches. The ISU 402 can also exchange data with various resources, such as general-purpose registers (GPR) (not shown) and floating point registers (not shown). The GPR and FPR can provide data value storage for data values loaded and stored from the L1 cache 226 by the load store unit (LSU).

In at least one embodiment, the complex instruction utilized is a "LOAD MULTIPLE" instruction, which is cracked or divided into multiple internal "load" micro-ops. Each of the micro-ops are assigned a load number and are then separately issued to a Load/Store Unit (LSU) that implements the logical cache. In one example, the LOAD MULTIPLE instruction is split such that each "load" micro-op loads one 16 byte register with values from memory (or the cache subsystem), instead of executing the whole architected operation of writing multiple registers in one step.

The data selector 404 can be constructed as a multiplexer (MUX) or switch, which outputs either the predicted set-ID signal generated by the set predictor 203 or the micro-op load number signal generated by the instruction cracking function 403. The data selector 404 includes a first data input that receives the set ID signal indicating the predicted set-ID (0:7), and a second data input that receives the micro-op load number signal indicative of the load number corresponding to the currently issued load micro-op.

The data selector 404 also includes a control input that receives the read translation mode signal 225. When the read translation mode signal 225 is set to the first state (e.g., binary "0"), the predicted set-ID signal generated by the set predictor 203 is output from the data selector 404. When, however, the read translation mode signal 225 set to the second state (e.g., binary "1"), the read translation mode is invoked. Accordingly, the data selector 404 outputs the micro-op load number signal indicating the currently issued micro-op and the index LA(50:55) on which to perform the lookup. Thus, in response to invoking the read translation mode, the currently issued micro-op is utilized to perform the lookup.

The logical directory 205 includes a first input that receives the index LA(50:55), and a second input that receives the selector output signal. When the read translation mode is disabled, the logical directory 205 receives the set-ID(0:7) output from the set predictor. When, however, the read translation mode is enabled, the second input receives the micro-op load number signal. Accordingly, the predicted set-ID signal generated by the set predictor 203 is effectively ignored, and a lookup compare is performed based on the index LA(50:55) indicated by the currently issued micro-op. Logical directory information in the form of a logical directory tag corresponding t is then retrieved and output from the logical directory 205.

The hit detector circuit 215 includes a comparator 408 and an enabler 410. The comparator 408 compares the logical directory tag with the information included in the read translation mode signal 225. When information does not match, the comparator 408 outputs a first signal (e.g., a binary "0"). Accordingly, the enabler 410 blocks information from being delivered to the translation state register 406.

When, however, the information matches, the comparator 408 outputs a second signal (e.g., a binary "1"), the enabler 410 outputs the relevant translation information to the translation state register 406. The relevant translation information can vary depending on the ISA. In any architecture, however, the relevant translation information indicates whether the translation as set up to be checked/polled according to the read translation mode does exist in the logical directory 205. For example, the relevant information can indicate whether or not the requested translation "hit" in the logical directory, along with indicating whether the checked/polled translation is a "valid" and "existing" translation in the logical directory as part of the logical directory's 205 current translation state.

The enabler 410 can also selectively deliver additional translation related information to the translation state register 406 based on whether or not the comparator 408 indicates a hit. In terms of the z/Architecture recited herein, for example, the additional translation related information can include, but is not limited to, 1) a Storage Key (access-control bits and/or Fetch-Protection bit); 2) a DAT Protect bit; 3) a Common Segment bit; 4) a Private Space bit; and 5) a Real Space control bit. For other processor architectures, other information specific to that processor architecture can be output from the enabler 410 to the translation state register 406 when a hit is detected.

In at least one embodiment, the cache structure 200 further includes a multi-hit detector circuit 412. The multi-hit detector circuit 412 is configured to determine whether multiple "hits" occurred for a given translation. That is, the multi-hit detector circuit 412 can compare a currently detected cache hit, with previous cache hits recorded in the translation state register 406. When a multi-hit is detected, the multi-hit detector circuit 412 can set an error condition. The information indicating multiple hits also describes the "current translation state" of the logical directory (being in an invalid or "error" state to have multiple entries for the same translation).

Figure 5:
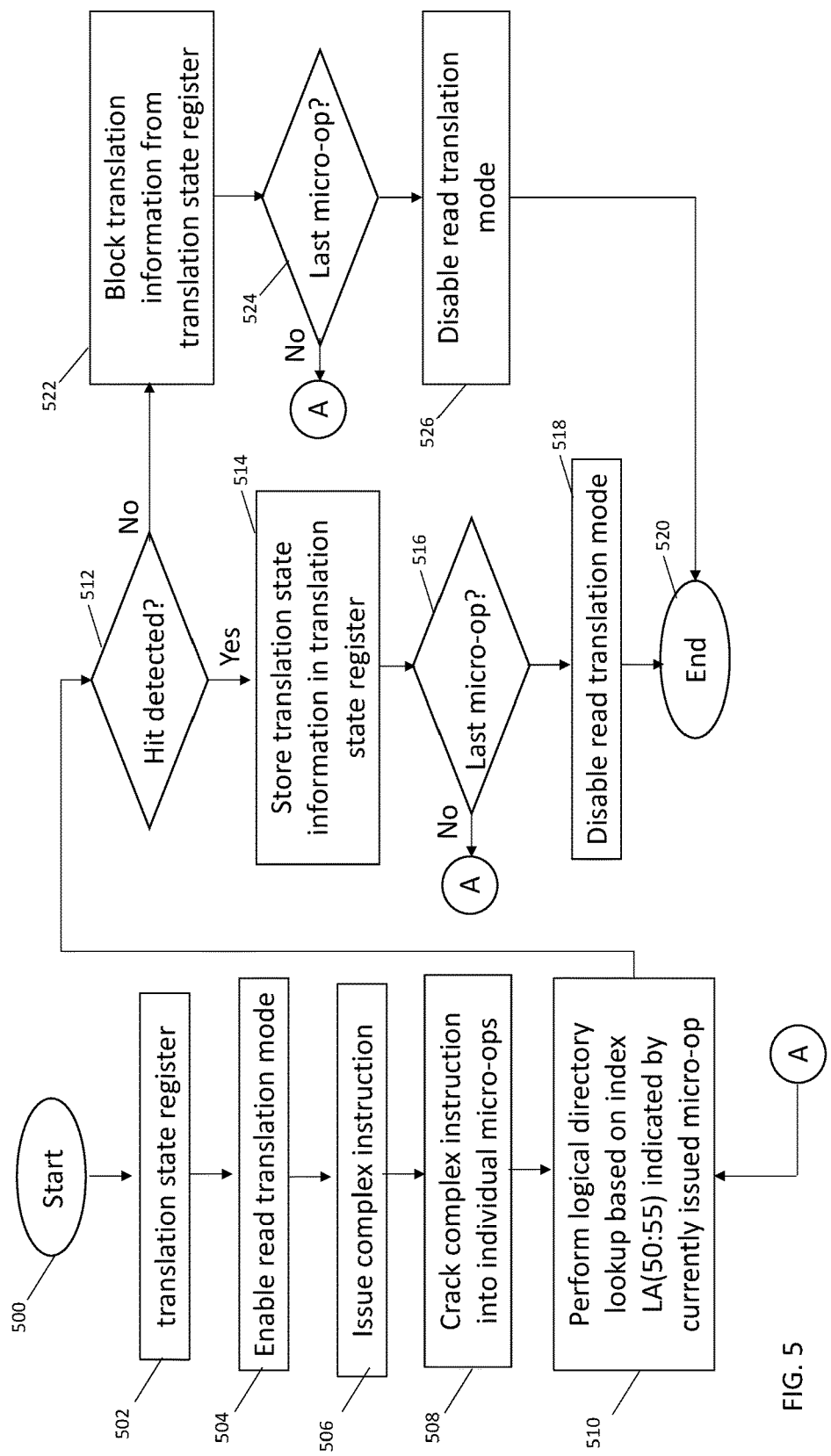
FIG. 5 is a flow diagram illustrating a method of determining a current state of an address translation in a microprocessor core cache using a cache directory in accordance with an example of the present disclosure.

With reference to FIG. 5, a method of determining a current state of an address translation in a microprocessor core cache using a cache directory is illustrated according to a non-limiting embodiment. The method begins at operation 500, and at operation 502 a hardware register (e.g., the translation state register 406) is cleared. In at least one embodiment, firmware 118 can initialize the translation state register 406 to an empty value indicating that a valid translation is not found. At operation 504, the operating mode of the cache structure 200 is switched from a normal operating mode to a read translation mode. The read translation mode is invoked in response to setting a bit value of a read translation mode signal 225 from a first binary state (e.g., a binary "0") to a second binary state (e.g., a binary "1"). In at least one embodiment, invoking the read translation mode forces the cache structure 200 to ignore the predicted set-ID signal generated by the set predictor 203. In addition, invoking the read translation mode can command the processor unit 101 to prevent changes from occurring in the logical directory 205 (e.g., prevent writes to the logical directory 205) and/or prevents execution of any out-of-order or other parallel processes.

At operation 506 a complex instruction (e.g., a LOAD MULTIPLE instruction) is issued, and at operation 508 the complex instruction is cracked into several independent micro-ops. In at least one embodiment, the read translation mode can command the processor unit 101 to execute only the currently issued complex instruction (e.g., the issued LOAD MULTIPLE instruction) until the read translation mode is disabled. At operation 510, a currently issued micro-op is executed. In at least one embodiment, execution of the micro-op includes performing a logical directory lookup based on the index LA(50:54) indicated by the currently issued micro-op.

At operation 512, a determination as to whether a hit in the logical directory 205 is detected. When a hit is detected, the current translation state is stored in the translation state register 406 at operation 514. At operation 516, a determination is made as to whether the final micro-op among the all the cracked micro-ops has been executed. When the final micro-op has not been executed (i.e., additional micro-ops exists), then the method returns to operation 510, and the operations described above are repeated. When, however, the last micro-op is detected at operation 516, the translation read mode is disabled at operation 518, and the method ends at operation 520.

Referring again to operation 512, when a hit is not detected at, translation information is blocked from delivery to the translation state register 406 at operation 522, and a determination is made as to whether the final micro-op among the all the cracked micro-ops has been executed at operation 524. When the final micro-op has not been executed (i.e., additional micro-ops exists), then the method returns to operation 510, and the operations described above are repeated. When, however, the last micro-op is detected at operation 524, the translation read mode is disabled at operation 526, and the method ends at operation 520. In at least one embodiment, the method can be automatically repeated for multiple LA(52:55) combinations, if needed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A cache structure implemented in a microprocessor core, the cache structure comprising:
   a set predictor containing a plurality of predictor data sets, each predictor data set containing cache line information, the set predictor configured to output a first set-ID indicative of an individual predictor data set among the plurality of predictor data sets; and
   a logical directory containing a plurality of logical data sets, each logical data set containing cache line information,
   wherein the cache structure selectively operates in a first mode such that the logical directory receives the first set-ID that points to an individual logical data set among the plurality of logical data sets, and a second mode such that the logical directory receives a currently issued micro operational instruction (micro-op)

containing a second set-ID that points to an individual logical data set among the plurality of logical data sets, and wherein the logical directory performs a cache lookup based on the first set-ID in response to operating in the first mode, and performs a cache lookup based on the second set-ID in response to operating in the second mode.

2. The cache structure of claim 1, further comprising a data selector including a first data input that receives the first set-ID, a second data input that receives the second set-ID, and an output in signal communication with the logical directory, the data selector configured to output the first set-ID while blocking the second set-ID in response to operating in the first mode, and to output the second set-ID while blocking the first set-ID in response to operating in the second mode.

3. The cache structure of claim 2, further comprising a hit detector circuit configured to receive the currently issued micro-op in response to invoking the second mode, and to detect a cache hit in the logical directory based on the currently issued micro-op.

4. The cache structure of claim 3, further comprising a hardware register in signal communication with the hit detector circuit, the hardware register configured to receive and store current translation state information of the logical directory in response to detecting the cache hit.

5. The cache structure of claim 4, further comprising a multi-hit detector circuit configured to detect a multiple cache hit based on a comparison between a currently detected cache hit and at least one previous cache hit recorded in the hardware register.

6. The cache structure of claim 5, wherein the multi-hit detector stores multi-hit error information in the hardware register indicating the detected multiple cache hit.

7. The cache structure of claim 4, further comprising an instruction sequence unit (ISU) configured to receive a complex instruction, and perform an instruction cracking function that divides the complex instruction into a plurality of individual micro-ops, wherein at least one of the individual micro-ops is output as the currently issued micro-op.

8. The cache structure of claim 4, wherein the set predictor is a directory indexed with a plurality of rows, each row having assigned thereto a first local address, and each row of the directory containing the plurality of predictor data sets, and wherein the logical directory is indexed with a plurality of rows, each row having assigned thereto a second local address, and each row of the directory containing the plurality of logical data sets.

9. A computer-implemented method of determining a current state of an address translation in a microprocessor core cache, the method comprising:

storing a plurality of predictor data sets containing cache line information in a set predictor, and outputting a first set-ID indicative of an individual predictor data set among the plurality of predictor data sets;

storing a plurality of logical data sets in a logical directory, each logical data set containing cache line information;

selectively operating a cache structure in a first mode such that the logical directory receives the first set-ID, and a second mode such that the logical directory receives a currently issued micro operational instruction (micro-op) containing a second set-ID that points to an individual logical data set among the plurality of logical data sets; and performing a cache lookup in the logical directory based on the second set-ID in response to operating in the second mode, and determining the current state of the address translation based on the cache lookup.

10. The method of claim 9, further comprising outputting the first set-ID while blocking the second set-ID in response to operating in the first mode, and outputting the second set-ID while blocking the first set-ID in response to operating in the second mode.

11. The method of claim 10, further comprising detecting a cache hit in the logical directory based on the currently issued micro-op.

12. The method of claim 11, further comprising storing, in a hardware register, current translation state information of the logical directory in response to detecting the cache hit.

13. The method of claim 12, further comprising detecting a multiple cache hit based on a comparison between a currently detected cache hit and at least one previous cache hit recorded in the hardware register.

14. The method of claim 13, further comprising storing multi-hit error information in the hardware register indicating the detected multiple cache hit.

15. The method of claim 12, further comprising dividing a complex instruction into a plurality of individual micro-ops, and outputting at least one of the individual micro-ops as the currently issued micro-op.

16. A computer program product to control a cache structure to determine a current state of an address translation in a microprocessor core cache, the computer program product comprising a computer readable storage medium having program instructions embodied therewith, the program instructions executable by an electronic computer processor to control the cache structure to perform operations comprising:

storing a plurality of predictor data sets containing cache line information in a set predictor, and outputting a first set-ID indicative of an individual predictor data set among the plurality of predictor data sets;

storing a plurality of logical data sets in a logical directory, each logical data set containing cache line information;

selectively operating the cache structure in a first mode such that the logical directory receives the first set-ID, and a second mode such that the logical directory receives a currently issued micro operational instruction (micro-op) containing a second set-ID that points to an individual logical data set among the plurality of logical data sets; and performing a cache lookup in the logical directory based on the second set-ID in response to operating in the second mode, and determining the current state of the address translation based on the cache lookup.

17. The computer program product of claim 16, further comprising outputting the first set-ID while blocking the second set-ID in response to operating in the first mode, and outputting the second set-ID while blocking the first set-ID in response to operating in the second mode.

18. The computer program product of claim 17, further comprising detecting a cache hit in the logical directory based on the currently issued micro-op, and storing, in a hardware register, current translation state information of the logical directory in response to detecting the cache hit.

19. The computer program product of claim 18, further comprising detecting a multiple cache hit based on a comparison between a currently detected cache hit and at least one previous cache hit recorded in the hardware register, and storing multi-hit error information in the hardware register indicating the detected multiple cache hit.

20. The computer program product of claim 18, further comprising dividing a complex instruction into a plurality of individual micro-ops, and outputting at least one of the individual micro-ops as the currently issued micro-op.

\* \* \* \* \*